(12) United States Patent
Nazarpoor et al.

(10) Patent No.: US 9,517,449 B2
(45) Date of Patent: Dec. 13, 2016

(54) OPTIMIZATION OF WASHCOAT ADHESION OF ZERO-PGM CATALYST ON METALLIC SUBSTRATES

(71) Applicant: Clean Diesel Technologies, Inc., Oxnard, CA (US)

(72) Inventors: Zahra Nazarpoor, Camarillo, CA (US); Sen Kitazumi, Oxnard, CA (US); Johnny T. Ngo, Oxnard, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 466 days.

(21) Appl. No.: 13/927,850

(22) Filed: Jun. 26, 2013

(65) Prior Publication Data

US 2015/0005158 A1    Jan. 1, 2015

(51) Int. Cl.

| | | |
|---|---|---|
| *B01J 23/10* | (2006.01) | |
| *B01J 23/72* | (2006.01) | |
| *B01J 37/02* | (2006.01) | |
| *B01J 23/83* | (2006.01) | |
| *B01D 53/94* | (2006.01) | |
| *B01J 37/03* | (2006.01) | |
| *B01J 35/00* | (2006.01) | |
| *B01J 35/02* | (2006.01) | |
| *B01J 35/04* | (2006.01) | |
| *B01J 37/00* | (2006.01) | |

(52) U.S. Cl.
CPC .............. *B01J 23/72* (2013.01); *B01D 53/944* (2013.01); *B01J 23/83* (2013.01); *B01J 37/0225* (2013.01); *B01D 2255/206* (2013.01); *B01D 2255/207* (2013.01); *B01D 2255/65* (2013.01); *B01D 2255/908* (2013.01); *B01J 35/002* (2013.01); *B01J 35/0066* (2013.01); *B01J 35/023* (2013.01); *B01J 35/04* (2013.01); *B01J 37/0036* (2013.01); *B01J 37/03* (2013.01)

(58) Field of Classification Search
CPC ........................................................ B01J 23/72
See application file for complete search history.

(56) References Cited

U.S. PATENT DOCUMENTS

2009/0324468 A1*  12/2009  Golden et al. ................ 423/210

FOREIGN PATENT DOCUMENTS

WO    WO 2013028575 A1 *  2/2013  ........... B01D 53/944

* cited by examiner

*Primary Examiner* — Colleen Dunn
*Assistant Examiner* — Haytham Soliman
(74) *Attorney, Agent, or Firm* — Alston & Bird LLP

(57) ABSTRACT

Solutions to the problem of washcoat and/or overcoat adhesion loss of ZPGM catalyst on metallic substrates are disclosed. Present disclosure provides a novel process for improving WCA to metallic substrates of ZPGM catalyst systems. Reduction of WCA loss and improved catalyst activity may be enabled by the selection of processing parameters determined from variations of pH and addition of binder to overcoat slurry, and particle size of washcoat. Processing parameters may be applied to a plurality of metallic substrates of different geometries and cell densities.

9 Claims, 4 Drawing Sheets

OPTIMIZATION OF WASHCOAT ADHESION OF ZERO-PGM CATALYST ON METALLIC SUBSTRATES

CROSS-REFERENCE TO RELATED APPLICATIONS

N/A

BACKGROUND

Technical Field

The present disclosure relates generally to ZPGM catalyst systems, and, more particularly, to a process to enhance the washcoat adhesion (WCA) on metallic substrates in ZPGM catalyst systems.

Background Information

Catalyst in catalytic converters may be manufactured to decrease pollution caused by exhaust gases from automobiles, utility plants, processing and manufacturing plants, trains, airplanes, mining equipment and other engine-equipped machinery. A major problem in the manufacturing of catalyst systems may be achieving the required adhesion of a washcoat to a substrate and/or adhesion of a washcoat to an overcoat.

The high porosity of the surface in ceramic substrates may provide a high degree of coating adhesion. This is not the case for the adhesion of coating to metallic substrates which may be affected by type of materials used and other factors. Factors that may affect adhesion include, but are not limited to, substrate geometry and size, substrate cell density, washcoat (WC) and overcoat (OC) particle size distribution, additive or dopant properties, amounts of WC and OC loadings, ratio of alumina to oxygen storage material (OSM), and treatment. To this end, there may be a need for improvements in the process of making a ZPGM catalyst system with lower loss of adhesion and improved catalyst performance.

SUMMARY

The present disclosure may provide solutions to the problem of washcoat and/or overcoat adhesion (WCA) loss on metallic substrates, as well as a novel process of improving WCA to metallic substrates for ZPGM catalyst systems. Reduction of WCA loss may also improve the ZPGM catalyst system performance and activity.

According to embodiments in present disclosure, compositions of ZPGM catalyst systems may include any suitable combination of a metallic substrate, a washcoat, and an overcoat which includes copper (Cu), cerium (Ce), and other metal combinations. Catalyst samples with metallic substrate of varied geometry and cells per square inch (CPSI) may be prepared using any suitable synthesis method as known in current art. An initial composition may be prepared and variations of a set of parameters may be employed to control WCA loss in accordance to the influence of each parameter.

WCA loss may be controlled by varying the pH of ZPGM containing slurry, presence of the binder added to the ZPGM containing slurry, and adjusting the particle size of the slurry. A % WCA loss threshold may be initially set as the acceptable range for the % WCA loss that may be obtained from the variations of the parameters influencing WCA on catalyst samples. The catalyst samples may be subsequently characterized examining catalyst activity with comparison of the temperature HC T50 in HC conversion, which may result from variations of parameters used in present disclosure. XRD analysis may be used to calculate dispersion of active base metal.

Optimal results in reduction of WCA loss according to the parameter variations may be registered for application to other metallic substrates geometries, sizes, and cell densities. The process of WCA loss control for other metallic substrates may use the values of the parameters that may produce the optimal reduction in WCA loss and enhanced catalyst activity and performance.

Numerous objects and advantages of the present disclosure may be apparent from the detailed description that follows and the drawings which illustrate the embodiments of the present disclosure, and which are incorporated herein by reference.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
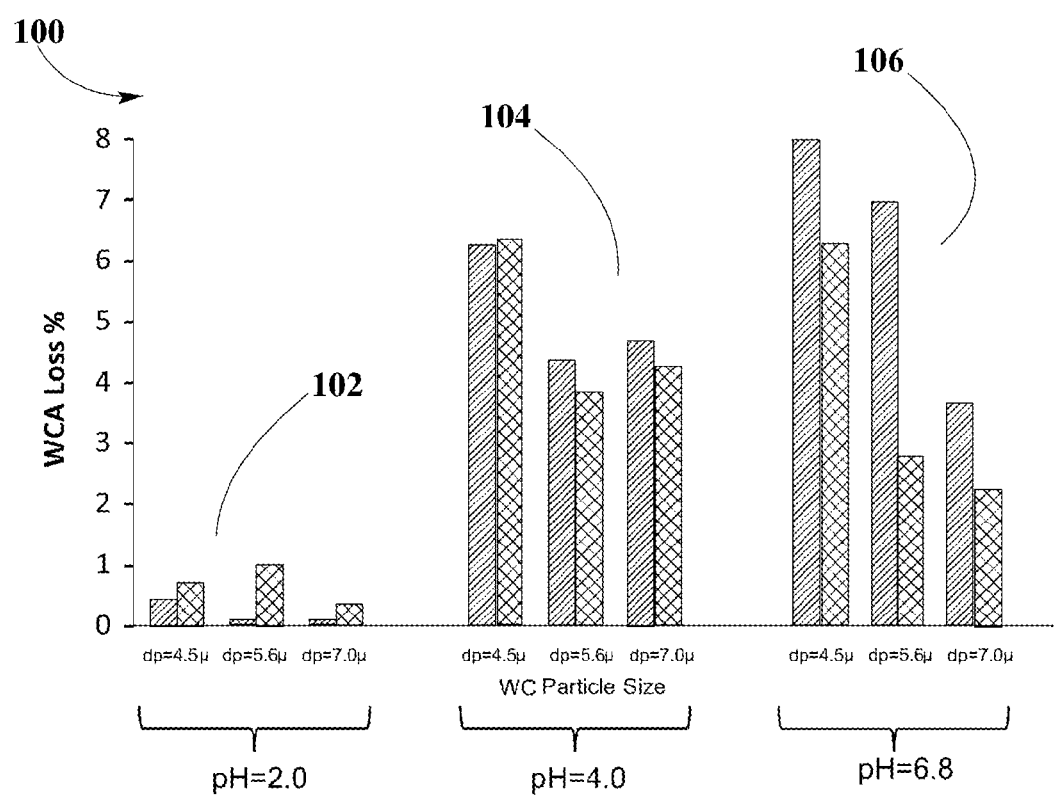
FIG. 1 shows a WCA loss comparison for ZPGM catalysts on metallic substrates with variations of WCA control parameters, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms have the following definitions:

"Substrate" may refer to any material of any shape or configuration that yields a sufficient surface area for depositing a washcoat and/or overcoat.

"Washcoat" may refer to at least one coating including at least one oxide solid that may be deposited on a substrate.

"Overcoat" may refer to at least one coating that may be deposited on at least one washcoat layer.

"Catalyst" may refer to one or more materials that may be of use in the conversion of one or more other materials.

"Zero platinum group (ZPGM) catalyst" may refer to a catalyst completely or substantially free of platinum group metals.

"Conversion" may refer to the chemical alteration of at least one material into one or more other materials.

"$d_{50}$" may refer to the average size of 50% of particles distributed in a washcoat.

"T50" may refer to the temperature at which 50% of a material is converted.

"Oxygen storage material (OSM)" may refer to a material able to take up oxygen from oxygen rich streams and able to release oxygen to oxygen deficient streams.

DESCRIPTION OF THE DRAWINGS

Various example embodiments of the present disclosure are described more fully with reference to the accompanying drawings in which some example embodiments of the present disclosure are shown. Illustrative embodiments of the present disclosure are disclosed here. However, specific structural and functional details disclosed here are merely representative for purposes of describing example embodiments of the present disclosure. This disclosure however, may be embodied in many alternate forms and should not be construed as limited to only the embodiments set forth in the present disclosure.

Preparation of ZPGM Catalyst on Metallic Substrate

A ZPGM catalyst system including a ZPGM transition metal catalyst having a metallic substrate, a washcoat (WC) and an overcoat (OC) is prepared. Metallic substrate may be used with different dimension and cell density (CPSI). WC may include an oxygen storage material (OSM) and support oxide. OC includes copper oxide, cerium oxide, support oxide, and at least one OSM, which may be a mixture of cerium (Ce), zirconium (Zr), neodymium (Nd), and praseodymium (Pr). The support oxide may include any type of alumina or doped alumina. The OSM and the alumina may be present in WC in a ratio between 40% and about 60% by weight. The alumina and OSM included in OC are present in a ratio of about 60% to about 40% by weight. The copper (Cu) and Ce in OC are present in about 5% to about 50% by weight or from about 10% to 16% by weight of Cu and 12% to 20% by weight of Ce. The ZPGM catalyst system may be prepared using co-milling, co-precipitation or other preparation technique known in the art. After deposition, washcoat and overcoat may be calcined (fired). This thermal treatment may be performed at about 300° C. to about 700° C. In some embodiments this treatment may be performed at about 550° C. The heat treatment may last from about 2 to about 6 hours. In an embodiment the treatment may last about 4 hours. However, the ramp of heating treatment may vary in some embodiments. The WC and OC loading may vary from 60 g/L to 200 g/L, separately.

WCA Control Parameters

According to embodiments in the present disclosure, WCA loss may be controlled by varying a set of parameters which may have an influence in WCA and performance of ZPGM catalyst systems on metallic substrates. Additionally, a design threshold of % WCA loss of 3% may be set for the comparison of results from the variation of selected control parameters.

The control parameters that may be used in the present disclosure may include, but not limited to, variation of pH of OC slurry, which may have an influence on dispersion of Cu in the samples; addition of a binder to the OC, which may influence adhesion of the OC layer; and variation of the WC particle size, which may influence cohesion between WC particles and OC particles. The optimal results from variations of the control parameters may be registered and applied to a plurality of metallic substrates for verification of the desired level of WCA that may provide lower WCA loss and improved catalyst activity.

The following examples are intended to illustrate the scope of the disclosure. It is to be understood that other procedures known to those skilled in the art may alternatively be used.

Example #1

Effect of Varying the pH of Overcoat Slurry Containing ZPGM

Example #1 may illustrate the effect of varying pH of OC slurry for catalyst samples on a metallic substrate of a dimension of D40 mm×L90 mm, 300 CPSI. Samples may be prepared to include WC loading of 120 g/L. WC may include any type of alumina or doped alumina. In an embodiment, OC may have a total loading of 120 g/L. OC total loading may include any type of alumina or doped alumina, OSM, and Cu loading of 10 g/L to 15 g/L and Ce loading of 12 g/L to 18 g/L.

The influence of Cu dispersion on WCA may be examined by varying the by pH of OC slurry. The pH of OC slurry may vary by adjusting the amount of base solution added to adjust the rheology of slurry. Some examples of compounds that can be used to adjust the rheology may include ammonium hydroxide, aluminum hydroxide, tetraethyl ammonium hydroxide, other tetralkyl ammonium salts, ammonium acetate, ammonium citrate and other suitable compounds. In present disclosure pH values may be varied to strong acidic range such as 2.0, mild acidic range such as 4.0, and approximately neutral condition such as pH of 6.8. The XRD analysis is done to measure the effect of pH on copper dispersion. The resulting % of WCA loss from each variation may be compared and optimal result indicating a reduction of WCA loss may be registered relative to the established acceptable range of 3% WCA loss threshold and catalyst activity examined at HC T50 for each variation.

Example #2

Effect of Presence and Absence of Binder in OC Slurry Containing ZPGM

Example #2 may illustrate the effect of adding a binder to OC of catalyst samples on a metallic substrate of dimension of D40 mm×L90 mm, 300 CPSI. Catalyst samples may be prepared according to same composition as described in example #1, including variations of pH values of 2.0, 4.0, and 6.8. The absence or presence of a binder in the OC may provide the influence of the alumina-based binder on the adhesion of the OC layer. An alumina type binder is used in the samples containing binder. The resulting % of WCA loss from the absence or presence of binder may be compared and optimal result indicating a reduction of WCA loss may be registered relative to the established acceptable range of 3% WCA loss threshold and catalyst activity examined at HC T50 for each variation.

Example #3

Effect of Particle Size of Washcoat Slurry

Example #3 may illustrate the effect of varying WC particle size in catalyst samples on a metallic substrate of dimension D40 mm×L90 mm, 300 CPSI, prepared according to same composition as described in example #1, including variations of pH values of 2.0, 4.0, and 6.8, and in absence or presence of a binder in the OC slurry containing ZPGM.

The lack of the cohesion between WC and OC particles may result in a high percentage of WCA loss. In this example, WC particle size, $d_{50}$, in washcoat slurry of alumina may be varied to 4.5 μm, 5.6 μm, and 7.0 μm. Resulting % WCA loss from variations of WC particle size may be compared, including variations of pH and absence or presence of a binder in the OC. This comparison may provide desirable level of % WCA loss and optimal catalyst activity at HC T50.

According to principles in the present disclosure, results of reduction of WCA loss and enhanced catalyst activity at HC T50 may be selected from the analysis of all variables in regards to their compound effect to optimize washcoat adhesion on metallic substrates and improve catalyst performance. The optimal results from variations of the WCA control parameters may be registered and applied to a plurality of metallic substrates for verification of the desired level of WCA that may provide lower WCA loss and improved catalyst activity.

Characterization of Catalyst Samples

FIG. 1 shows WCA loss comparison 100 for catalyst samples of example #1, example #2, and example #3 with variations of WCA control parameters, according to an embodiment. Bar chart 102 shows WCA loss for catalyst samples with OC slurry pH of 2.0, and WC slurry particle sizes of 4.5 μm, 5.6 μm, and 7.0 μm, respectively, and with no binder in the OC slurry (slanted lines bars) and with binder in the OC slurry (mesh pattern bars). Bar chart 104 shows WCA loss for catalyst samples with OC slurry pH of 4.0, WC slurry particle sizes of 4.5 μm, 5.6 μm, and 7.0 μm, respectively, and with no binder in the OC slurry (slanted lines bars) and with binder in the OC slurry (mesh pattern bars). Bar chart 106 shows WCA loss for catalyst samples with OC slurry pH of 6.8, WC slurry particle sizes of 4.5 μm, 5.6 μm, and 7.0 μm, respectively, and with no binder in the OC slurry (slanted lines bars) and with binder in the OC slurry (mesh pattern bars).

As may be seen from the analysis of WCA loss comparison 100, in bar charts 102, 104, 106, the presence of binder may influence WCA and reduce % WCA loss except for the results in bar chart 102 for an OC slurry pH of 2.0, where in spite of a very low level of % WCA loss below the 3% WCA loss threshold, for particle size of 4.5 μm, 5.6 μm, and 7.0 μm, dispersion of Cu is very low, indicating that catalyst activity is low. In bar chart 104, for an OC slurry pH of 4.0, may be seen that an increase in WC slurry particle size from 4.5 μm, 5.6 μm, to 7.0 μm results in a high % WCA loss above the 3% WCA loss threshold. In this case, with WC particle size of 5.6 μm and binder in WC and OC, the percentage of WCA loss decreases but not below the % WCA loss threshold. In bar chart 106, for an OC slurry pH of 6.8, with binder in WC and OC, and WC particle size of 5.6 μm and 7.0 μm, may be seen that % WCA loss is reduced below the 3% WCA loss threshold. The influence of the particle size may reduce % WCA loss and WCA may be optimized with the addition of binder in OC at pH of 6.8.

According to principles in present disclosure, using a pH of 2.0 may not provide the desired optimization of WCA and improved catalyst activity. Combination of a pH of 6.8, a WC particle size of 7.0 μm and addition of binder in OC may provide the desirable optimization of WCA and catalyst performance. Optimal results in reduction of WCA loss, according to the parameter variations, may be registered for application to other metallic substrates geometries, sizes, and cell densities. The process of WCA loss control for other metallic substrates may use the values of the set of parameters that may produce the optimal reduction in WCA loss and enhanced catalyst activity and performance.

Figure 2:
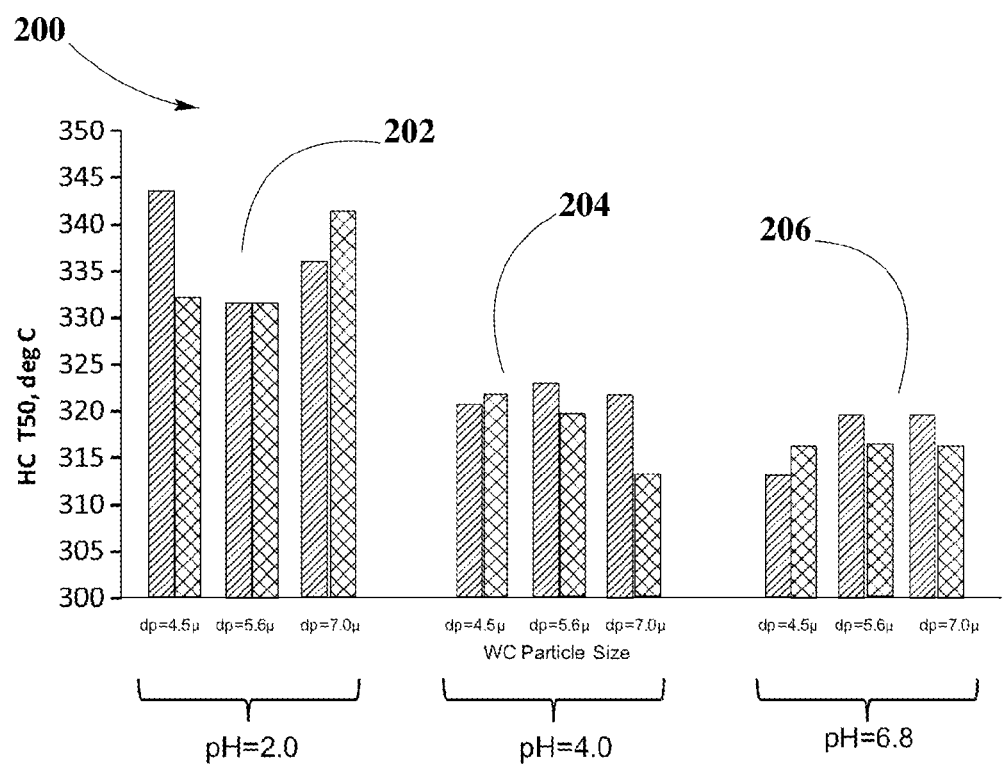
FIG. 2 illustrates catalyst activity HC T50 comparison with variations of WCA control parameters, according to an embodiment.

FIG. 2 illustrates catalyst activity HC T50 comparison 200 for catalyst samples of example #1, example #2, and example #3 with variations of WCA control parameters, according to an embodiment. HC T50 may be obtained from a light-off test which is done under lean condition and toluene is used as feed hydrocarbon. Bar chart 202 shows HC T50 for activity of catalyst samples with OC slurry pH of 2.0, WC slurry particle sizes of 4.5 μm, 5.6 μm, and 7.0 μm, respectively, and with no binder in the OC slurry (slanted lines bars) and with binder in the OC slurry (mesh pattern bars). Bar chart 204 shows HC T50 for activity of catalyst samples with OC slurry pH of 4.0, WC slurry particle sizes of 4.5 μm, 5.6 μm, and 7.0 μm, respectively, and with no binder in the OC slurry (slanted lines bars) and with binder in the OC slurry (mesh pattern bars). Bar chart 206 shows HC T50 for activity of catalyst samples with OC slurry pH of 6.8, WC slurry particle sizes of 4.5 μm, 5.6 μm, and 7.0 μm, respectively, and with no binder in the OC slurry (slanted lines bars) and with binder in the OC slurry (mesh pattern bars).

As may be seen from the analysis of HC T50 comparison 200, in bar charts 202, 204, 206, the presence of binder may influence WCA, reduce % WCA loss, and improve catalyst activity except for the results in bar chart 202 for a pH of 2.0, where in spite of a very low level of % WCA loss below the 3% WCA loss threshold, for particle size of 4.5 μm, 5.6 μm, and 7.0 μm, dispersion of Cu is very low, indicating that catalyst activity is low. In bar chart 202 may be seen that without binder in OC and with binder in WC and OC, the resulting temperatures T50 in HC conversion are higher in comparison to the rest of samples. For pH of 2.0 and variations in WC particle size, T50 for catalyst samples may vary from about 330° C. to about 345° C.

In bar chart 204, for an OC slurry pH of 4.0, may be seen that an increase in WC particle size from 4.5 μm, 5.6 μm, to 7.0 μm results in a higher % WCA loss above the 3% WCA loss threshold, as described in FIG. 1. In this case, with WCA particle size of 5.6 μm and binder in WC and OC, % of WCA loss decreased but not below the % WCA loss threshold. The effect of WC particle size and binder in the WC and OC may be seen in that the level of T50 for the catalyst samples improved to a range between 312° C. and 322° C. indicating better catalyst activity in HC conversion than for catalyst samples with a pH of 2.0. The lowest T50 in HC conversion was for a WC particle size of 7.0 μm, T50 of about 312° C., followed by a T50 of about 320° C., for a WC particle size of 5.6 μm.

In bar chart 206, for an OC slurry pH of 6.8, with binder in WC and OC, and WC particle size of 5.6 μm and 7.0 μm, may be seen that % WCA loss is reduced below the 3% WCA loss threshold, as described in FIG. 1. The influence of the particle size may reduce % WCA loss. Catalyst activity in HC conversion with the addition of binder in WC and OC may be seen as stable activity since level of T50 regardless of changes in WC particle size is observed about 315° C.

According to principles in present disclosure, using an OC slurry with pH of 2.0 may not provide the desired optimization of WCA and improved catalyst activity. Combination of a pH of 6.8, a WC particle size of 7.0 μm and addition of binder in the WC and OC may provide the desirable optimization of WCA and catalyst performance. Optimal results in reduction of WCA loss and improved catalyst activity, according to the parameter variations, may be registered for application to other metallic substrates geometries, sizes, and cell densities. The process of WCA loss control for other metallic substrates may use the values of the set of parameters that may produce the optimal reduction in WCA loss and enhanced catalyst activity and performance.

XRD Analysis and Cu Dispersion in OC Slurry

Figure 3:
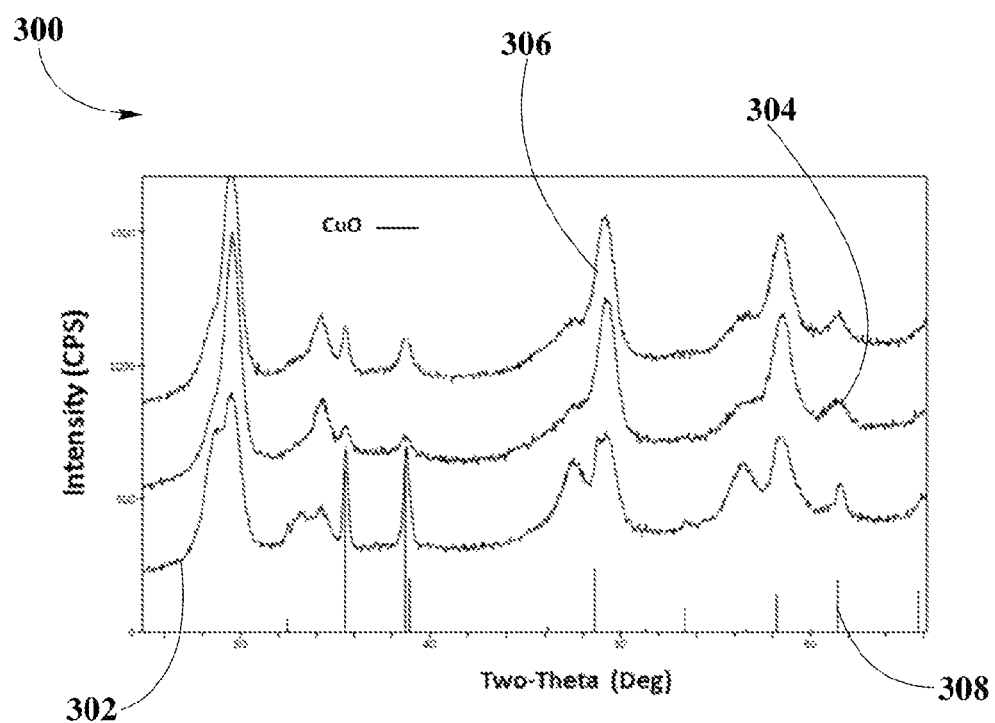
FIG. 3 presents XRD analysis for ZPGM catalyst samples on metallic substrate, according to an embodiment.

FIG. 3 presents XRD analysis 300 for catalyst samples of example #1, including variations of OC slurry pH values of 2.0, 4.0, and 6.8, according to an embodiment.

Spectrum curve 302 illustrates X-Ray diffraction peak of OC slurry with pH of 2.0; spectrum curve 304 represents X-Ray diffraction peak of OC slurry with pH of 4.0; and spectrum curve 306 shows X-Ray diffraction peak of OC slurry with pH of 6.8. Solid lines 308 depicts the position of CuO diffraction peaks. As may be seen in XRD analysis 300, the sharper CuO main peaks take place at positions 2θ of 35.5 degrees and 38.7 degrees, respectively, of OC slurry with pH of 2.0, spectrum curve 302, which correspond to the presence of larger Cu particles in the slurry. The crystallite size of copper were calculated by the most intense CuO peaks located at 2θ of 35.5 degrees and 38.7 degrees using the Scherrer equation as known in the art. Crystallite sizes may be subsequently used to calculate Cu dispersion for each sample at different pH. For the sample with OC slurry pH of 2.0, calculated crystallite size and Cu dispersion from XRD analysis 300 are 33 nm and 3.2%, respectively. For samples with pH of 4.0, calculated crystallite size and Cu dispersion from XRD analysis 300 are 21 nm and 4.8%, respectively. For samples with OC slurry pH of 6.8, calculated crystallite size and Cu dispersion from XRD analysis 300 are 22 nm and 4.7%, respectively.

For catalyst samples with an OC slurry pH of 2.0, in spite of a very low level of % WCA loss below the 3% WCA loss threshold, the lower Cu dispersion, obtained from XRD analysis 300 may explain the resulting high HC T50 and lower catalyst activity. These results may not optimize WCA and catalyst activity.

For catalyst samples with an OC slurry of pH of 4.0 and pH of 6.8, Cu dispersion is approximately similar. These results may explain their close HC T50 values as described in FIG. 2. However, combination of a pH of 6.8, WC particle size of 7.0 μm and addition of binder in the WC and OC may provide lower % WCA loss than catalyst samples with a pH of 4.0. Accordingly, a pH of 6.8 and a pH of 4.0 may be used as upper and lower limit for pH of OC slurry to optimize WCA and catalyst performance of ZPGM catalysts on metallic substrates.

According to principles in the present disclosure, the optimization of WCA and catalyst performance for ZPGM catalyst on metallic substrates may be achieved considering that pH of OC slurry containing ZPGM directly affect the WCA loss. WCA loss may be more significant at higher pH value of OC slurry. A higher pH may lead to a higher WCA loss. The larger particle size of WC slurry may reduce WCA loss. The addition of binder in OC slurry may have a positive effect on the desired optimization of WCA. To keep WCA loss at low levels, the WC particle size may be high and binder may be used in the OC slurry. The activity of catalyst samples may be directly correlated to Cu dispersion as observed for catalyst samples of a pH of 2.0 in which lower Cu dispersion significantly decreased the activity. Additionally, as a result of the correlation between catalyst activity and Cu dispersion, a lower and upper limit of pH of 4.0 and pH of 6.8, respectively, with binder in the OC slurry, may be used for optimal catalyst activity. In one embodiment, an OC slurry with pH of about 5.0 to 6.0, from result of pH of 4.0 to pH of 6.8 with safety margin for pH range may be used.

Processing parameters that may enable optimization of WCA and catalyst performance of ZPGM catalyst on D40 mm×L90 mm, 300 CPSI metallic substrates may be applied to ZPGM catalysts on different size and cell density of metallic substrates for WCA optimization according to principles in the present disclosure.

Application of WCA Optimization Parameters to Different Sizes of Metallic Substrates Example #4

Example #4 may illustrate the application of optimization parameters that may be obtained according to variations described in example #1, example #2, and example #3. The optimization parameters may be applied to determine the % WCA loss in fresh and aged catalyst samples on a metallic substrate of a dimension of D40 mm×L60 mm, 300 CPSI and D40 mm×L60 mm, 400 CPSI. Samples may be prepared containing alumina as support oxide with a WC loading of 120 g/L. The WC particle size range adjusted in the range of 6.0 μm to 7.0 μm. In an embodiment, OC may have a total loading of 120 g/L, including any type of alumina or doped alumina, OSM, and Cu loading of 12 g/L and Ce loading of 14.4 g/L. Overcoat may include any suitable alumina-based binder. The pH of OC slurry adjusted to about 5.0 to 6.0, from result of pH of 4.0 to pH of 6.8 with safety margin for pH range. After deposition, washcoat and overcoat may be calcined (fired). This thermal treatment may be performed at about 300° C. to about 700° C. In some embodiments this treatment may be performed at about 550° C. The heat treatment may last from about 2 to about 6 hours. In an embodiment the treatment may last about 4 hours. However, the ramp of heating treatment may vary in some embodiments. In case of aged samples, a dried thermal treatment at 900° C. for 4 hours is used.

Figure 4:
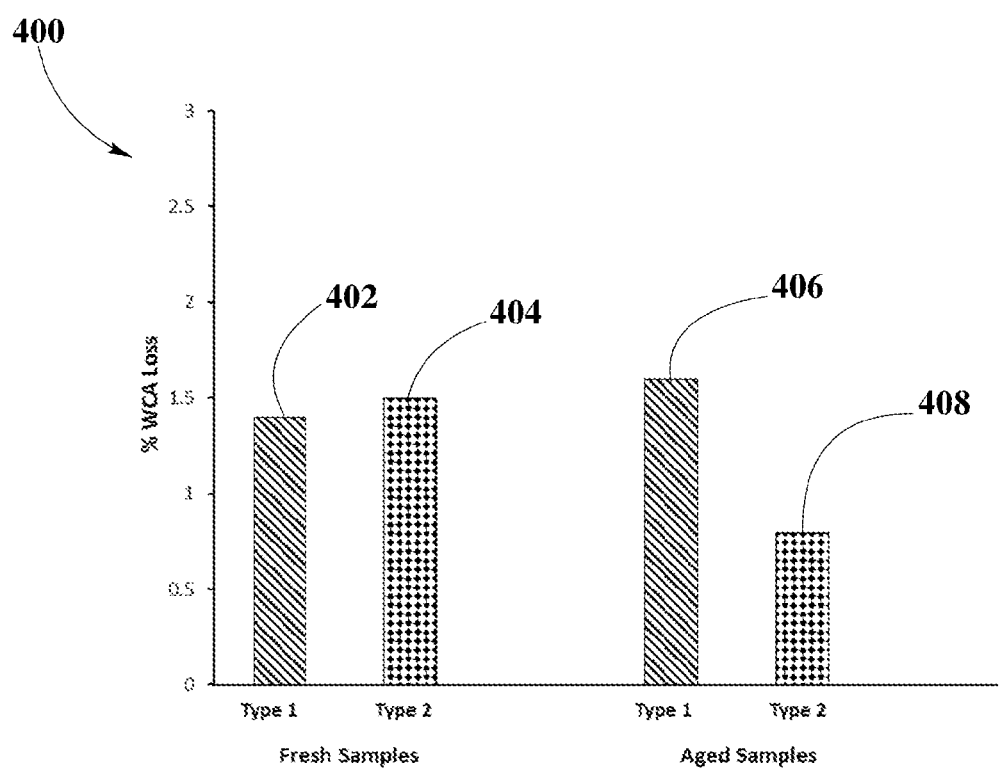
FIG. 4 depicts verification of WCA loss for a D40 mm×L60 mm metallic substrate, according to an embodiment.

FIG. 4 depicts verification of % WCA loss 400 for a D40 mm×L60 mm metallic substrate, according to an embodiment after the application of processing parameters for optimization of WCA and catalyst activity. Bar chart 402 is for the application of processing parameters to fresh catalyst samples on a D40 mm×L60 mm, 300 CPSI metallic substrate, labeled as Type 1 (slanted line bar). Bar chart 404 is for the application of processing parameters to fresh catalyst samples on a D40 mm×L60 mm, 400 CPSI metallic substrate, labeled as Type 2 (rhomboid pattern bar). Bar chart 406 is for the application of processing parameters to aged catalyst samples on a D40 mm×L60 mm, 300 CPSI metallic substrate, labeled as Type 1 (slanted line bar). Bar chart 408 is for the application of processing parameters to aged catalyst samples on a D40 mm×L60 mm, 400 CPSI metallic substrate, labeled as Type 2 (rhomboid pattern bar). As may be seen both types of fresh and aged catalyst samples showed optimization of WCA with % WCA loss in the range of about 1.5% of WCA loss to about 0.75% of WCA loss. This range of % WCA loss is significantly below of the 3% WCA loss threshold that was established in the present disclosure.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A method for manufacturing a catalyst system, the method comprising:
providing at least one substrate;
depositing a washcoat onto the substrate; adjusting a pH of at least one chemical slurry suitable for deposition on the substrate and comprising at least one ZPGM catalyst, wherein the chemical slurry comprises alumina or doped alumina, or a mixture thereof, an oxygen storage material, copper oxide, and cerium oxide; and
depositing the at least one chemical slurry overlying the washcoat, wherein the average particle size of the at least one chemical slurry is about 7 μm, and the pH is about 6.8 and wherein loading of the copper oxide is from 10 g/L to 15 g/L and the loading of the cerium oxide is from 12 g/L to 18 g/L.

2. The method according to claim 1, wherein the substrate comprises about 300 to about 400 cells per square inch.

3. The method according to claim 1, wherein the substrate is metallic.

4. A method for manufacturing a catalyst system, the method comprising:
providing at least one substrate;
depositing a washcoat on the substrate:
adjusting a pH of at least one chemical slurry suitable for deposition on the substrate and comprising at least one ZPGM catalyst, wherein the at least one chemical slurry comprises alumina as a binder; and
depositing the at least one chemical slurry on the substrate, wherein the pH of the at least one chemical slurry is about 6.8 and wherein the average particle size of the at least one chemical slurry is about 7 μm and wherein loading of a copper oxide is from 10 g/L to 15 g/L and the loading of a cerium oxide is from 12 g/L to 18 g/L.

5. The method according to claim 1, wherein the oxygen storage material including at least one selected from the group consisting of Ce, Zr, Nd, and Pr.

6. The method according to claim 1, wherein the at least one ZPGM catalyst is prepared by at least one method selected from the group consisting of co-milling and co-precipitation.

7. The method according to claim 1, wherein loss of deposited chemical slurry is less than about 3%.

8. The method according to claim 4, wherein the catalyst system obtains a $T_{50}$ of hydrocarbons less than 320° C. in a light-off test under lean condition and wherein the light-off test uses toluene as feed hydrocarbon.

9. The method according to claim 2, wherein the substrate comprises about 400 cells per square inch.

* * * * *